(12) United States Patent
Brogden

(10) Patent No.: US 9,346,159 B2
(45) Date of Patent: May 24, 2016

(54) INTERCHANGEABLE TOOL DEVICE

(71) Applicant: Cole Brogden, Calgary (CA)

(72) Inventor: Cole Brogden, Calgary (CA)

( * ) Notice: Subject to any disclaimer, the term of this patent is extended or adjusted under 35 U.S.C. 154(b) by 71 days.

(21) Appl. No.: 14/280,706

(22) Filed: May 19, 2014

(65) Prior Publication Data

US 2015/0328766 A1    Nov. 19, 2015

(51) Int. Cl.
| *A01B 1/20* | (2006.01) |
| *B25G 3/30* | (2006.01) |
| *B25F 1/02* | (2006.01) |
| *B25G 3/18* | (2006.01) |

(52) U.S. Cl.
CPC ... *B25G 3/30* (2013.01); *A01B 1/20* (2013.01); *B25F 1/02* (2013.01); *B25G 3/18* (2013.01)

(58) Field of Classification Search
CPC .............. A01B 1/00; A01B 1/06; A01B 1/20; A01B 1/22; A01B 1/227; B25G 3/12; B25G 3/14; B25G 3/30; B25G 3/18; B25H 3/023; B25F 1/02
USPC .............................. 7/114; 56/400.01–400.11; 172/375–378; 294/51, 57; 403/348
See application file for complete search history.

(56) References Cited

U.S. PATENT DOCUMENTS

| 4,441,747 A * | 4/1984 | Bryington, II | A01B 1/227 294/51 |
| 5,799,996 A * | 9/1998 | Fredrickson | A01B 1/20 172/375 |
| 6,439,630 B1 * | 8/2002 | Eatmon | A01B 1/00 206/374 |
| 6,671,930 B2 * | 1/2004 | Lanz | B25G 1/04 16/405 |
| 6,964,337 B2 * | 11/2005 | Engle | A45C 13/26 206/207 |
| 7,721,391 B2 * | 5/2010 | Bukovitz | B25G 3/14 15/145 |
| 8,960,743 B1 * | 2/2015 | Hasenjaeger | B25G 3/12 294/51 |

* cited by examiner

*Primary Examiner* — Robert Pezzuto
(74) *Attorney, Agent, or Firm* — Maxey Law Offices, PLLC; Stephen Lewellyn

(57) ABSTRACT

An interchangeable tool device has a handle with an external threaded portion and at least three lock members, a tool head with an internal threaded portion, and at least three lock apertures. The locking members are movable between a locked position and a free position. The lock apertures receive the lock members when the lock members are in the locked position and cooperate to limit rotation of the tool head relative to the handle. The lock apertures and the lock not limiting rotation of the tool head relative to the handle when the lock members are in the free position.

8 Claims, 12 Drawing Sheets

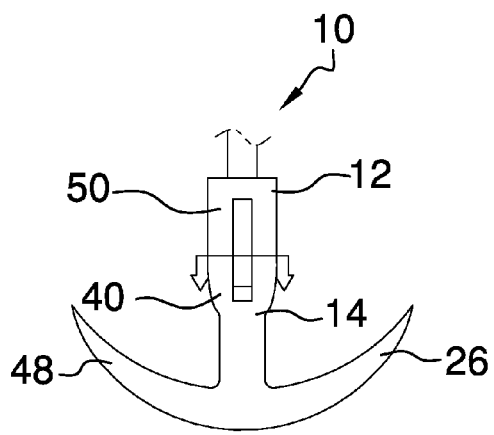
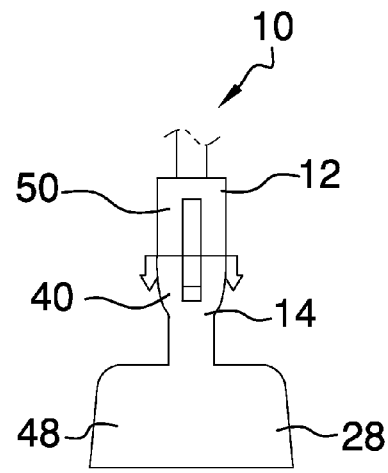
FIG. 7  FIG. 8
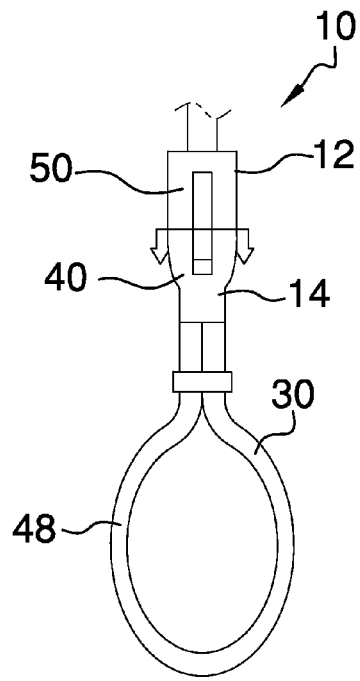
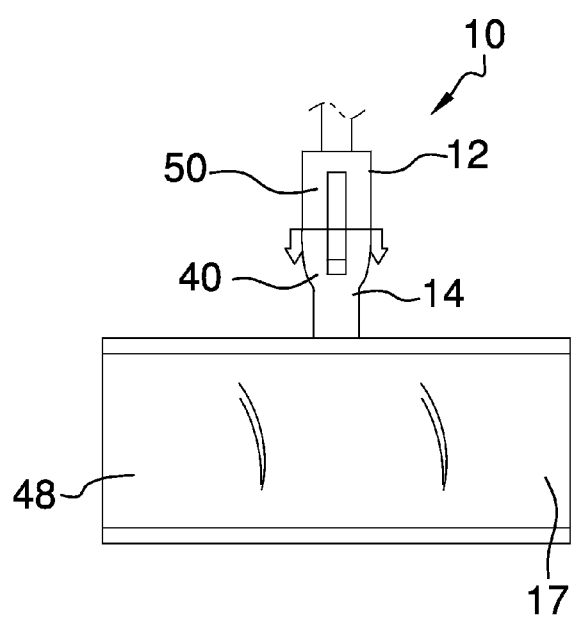
FIG. 9  FIG. 10

INTERCHANGEABLE TOOL DEVICE

FIELD OF THE INVENTION

The present invention relates generally to hand tools, and more particularly, relating to hand tools with interchangeable heads removably connectable to a tool handle.

BACKGROUND OF THE INVENTION

A wide variety of tools require handles for their use. Until now these tools include the handle as a part of the tool that is intended to remain attached to the tool during transportation or storage. These individual tools with handles cause storage and transportation problems for many users of the tools.

A homeowner who desires to do yard work, landscaping or gardening requires storage space for each of the tools used for these purposes. In order to ensure efficient performance of their respective jobs landscapers and contractors must bring a plurality of various tools including handles with them to their jobsites. These tools not only take up a lot of space on trucks or trailers, but are also unsightly, which can tarnish the image of the company doing the work.

While the devices heretofore fulfill their respective, particular objectives and requirements, they do not provide an interchangeable tool device which allow various tools to be attached and detached from a handle for storage and transportation, as such there exists a need for an interchangeable tool device, which substantially departs from the prior art, and in doing so provides an apparatus primarily developed for the purpose of providing a quickly attachable and detachable handle that can be used with various tools.

SUMMARY OF THE INVENTION

In view of the foregoing disadvantages inherent in the known types of tools with handles including removable handles now present in the prior art, the present invention provides a new interchangeable tool device wherein the same can be used for securely providing removable attachment between a tool and a handle for the tool.

In accordance with the present invention, an interchangeable tool device allows secure removable attachment of a handle to a variety of tools.

In general, in one aspect, an interchangeable tool device for connecting a handle to a tool head is provided. The interchangeable tool device includes a handle and a tool head. The handle has a forward end, a rear end, an external threaded portion on a mating circumference of the forward end, and a plurality of lock members on a locking circumference of the forward end. The tool head has a receiving end, a working end, an internal threaded portion on a receiving circumference of the receiving end, and a plurality of lock apertures. The plurality of locking members are movable between a locked position and a free position. The plurality of lock apertures receive the plurality of lock members when the plurality of lock members are in the locked position. The plurality of lock apertures and the plurality of lock members cooperate to limit rotation of the tool head relative to the handle when the plurality of lock members are in the locked position. And, the plurality of lock apertures and the plurality of lock members do not limit rotation of the tool head relative to the handle when the plurality of lock members are in the free position.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there are illustrated embodiments of the invention.

BRIEF DESCRIPTION OF THE DRAWINGS

The following drawings illustrate by way of example and are included to provide further understanding of the invention for the purpose of illustrative discussion of the embodiments of the invention. No attempt is made to show structural details of the embodiments in more detail than is necessary for a fundamental understanding of the invention, the description taken with the drawings making apparent to those skilled in the art how the several forms of the invention may be embodied in practice. Identical reference numerals do not necessarily indicate an identical structure. Rather, the same reference numeral may be used to indicate a similar feature of a feature with similar functionality. In the drawings:

FIG. 7 is a partial front view of the interchangeable tool device, showing a pick ax tool head;

FIG. 8 is a partial front view of the interchangeable tool device, showing a scraper tool head;

FIG. 9 is a partial front view of the interchangeable tool device, showing a noose tool head;

FIG. 10 is a partial front view of the interchangeable tool device, showing a snow shovel tool head;

DETAILED DESCRIPTION OF THE INVENTION

Figure 1:
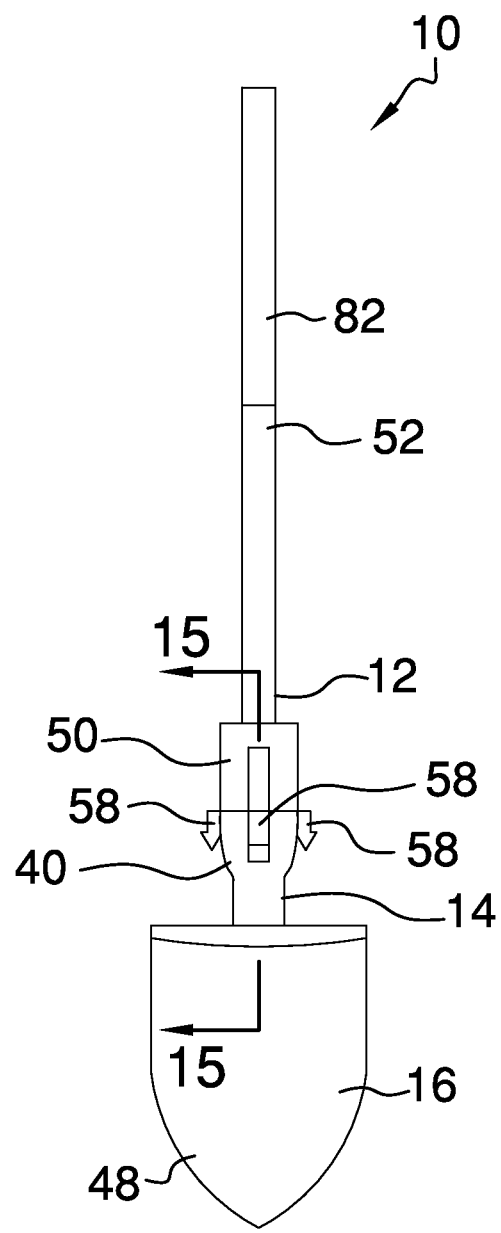
FIG. 1 is a front view of the interchangeable tool device constructed in accordance with the principles of the present invention.
Figure 2:
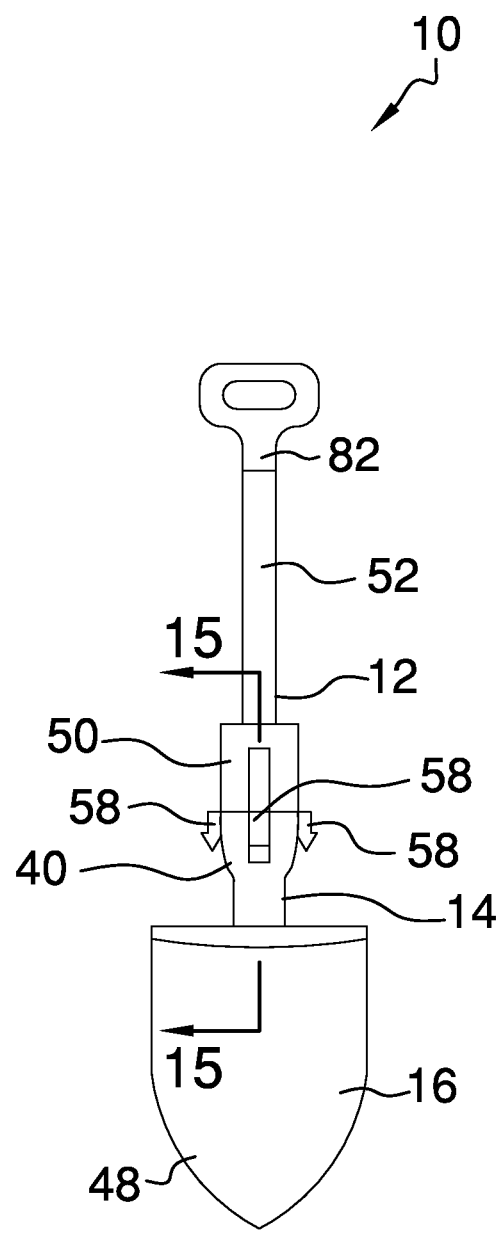
FIG. 2 is a front view of the interchangeable tool device constructed in accordance with the principles of the present invention.
Figure 3:
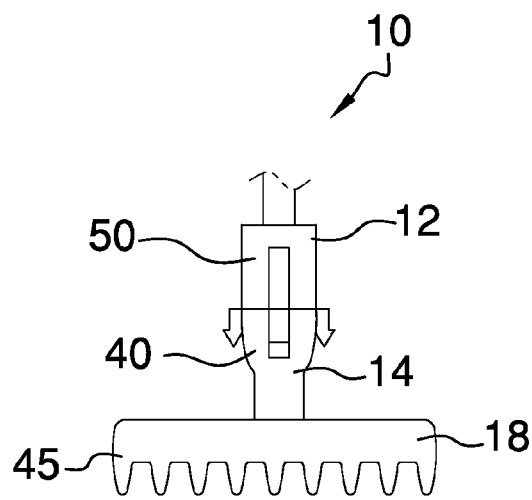
FIG. 3 is a partial front view of the interchangeable tool device, showing a rake tool head.
Figure 4:
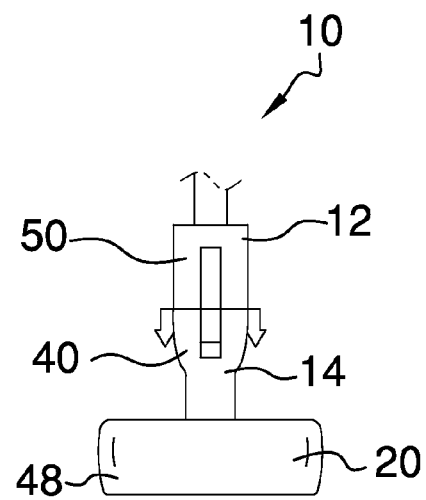
FIG. 4 is a partial front view of the interchangeable tool device, showing a sledgehammer tool head.
Figure 5:
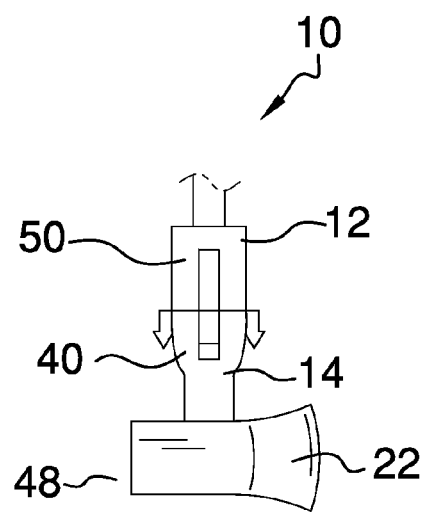
FIG. 5 is a partial front view of the interchangeable tool device, showing an ax tool head.
Figure 6:
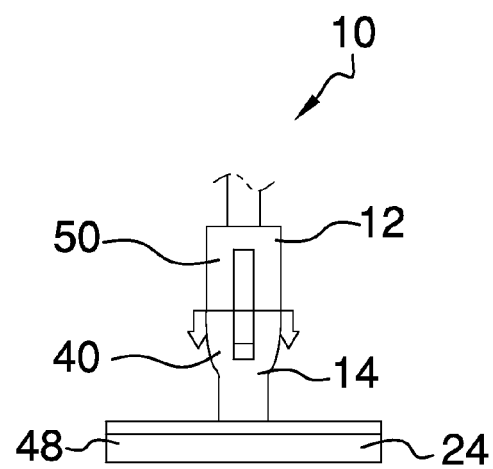
FIG. 6 is a partial front view of the interchangeable tool device, showing a squeegee tool head.
Figure 11:
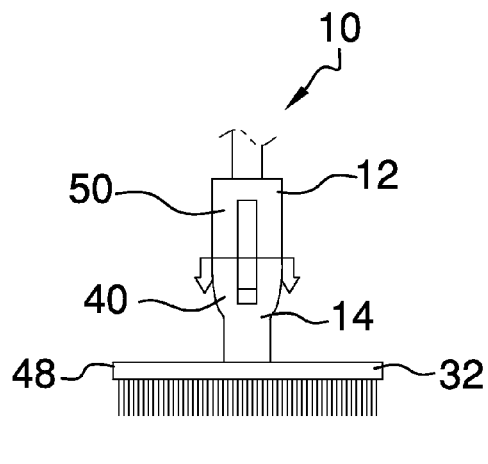
FIG. 11 is a partial front view of the interchangeable tool device, showing a push broom tool head.
Figure 12:
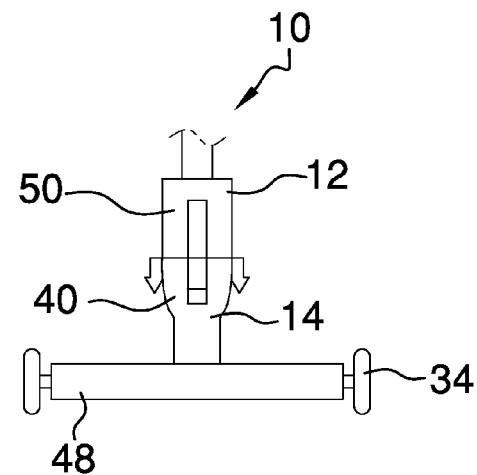
FIG. 12 is a partial front view of the interchangeable tool device, showing magnetic pickup tool head.
Figure 13:
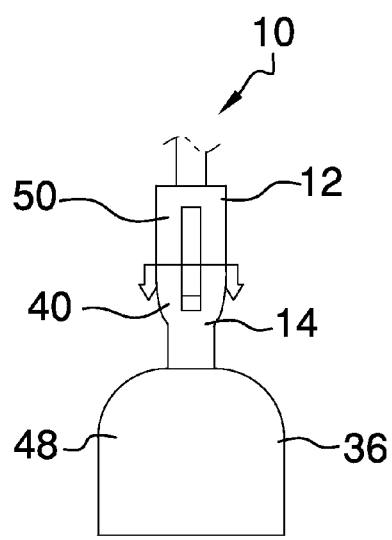
FIG. 13 is a partial front view of the interchangeable tool device, showing hoe tool head.
Figure 14:
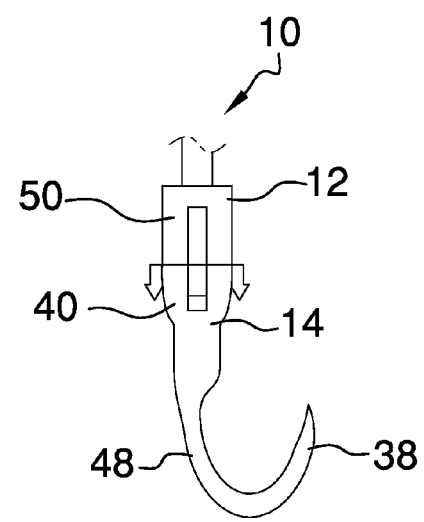
FIG. 14 is a partial front view of the interchangeable tool device, showing a hook tool head.
Figure 15:
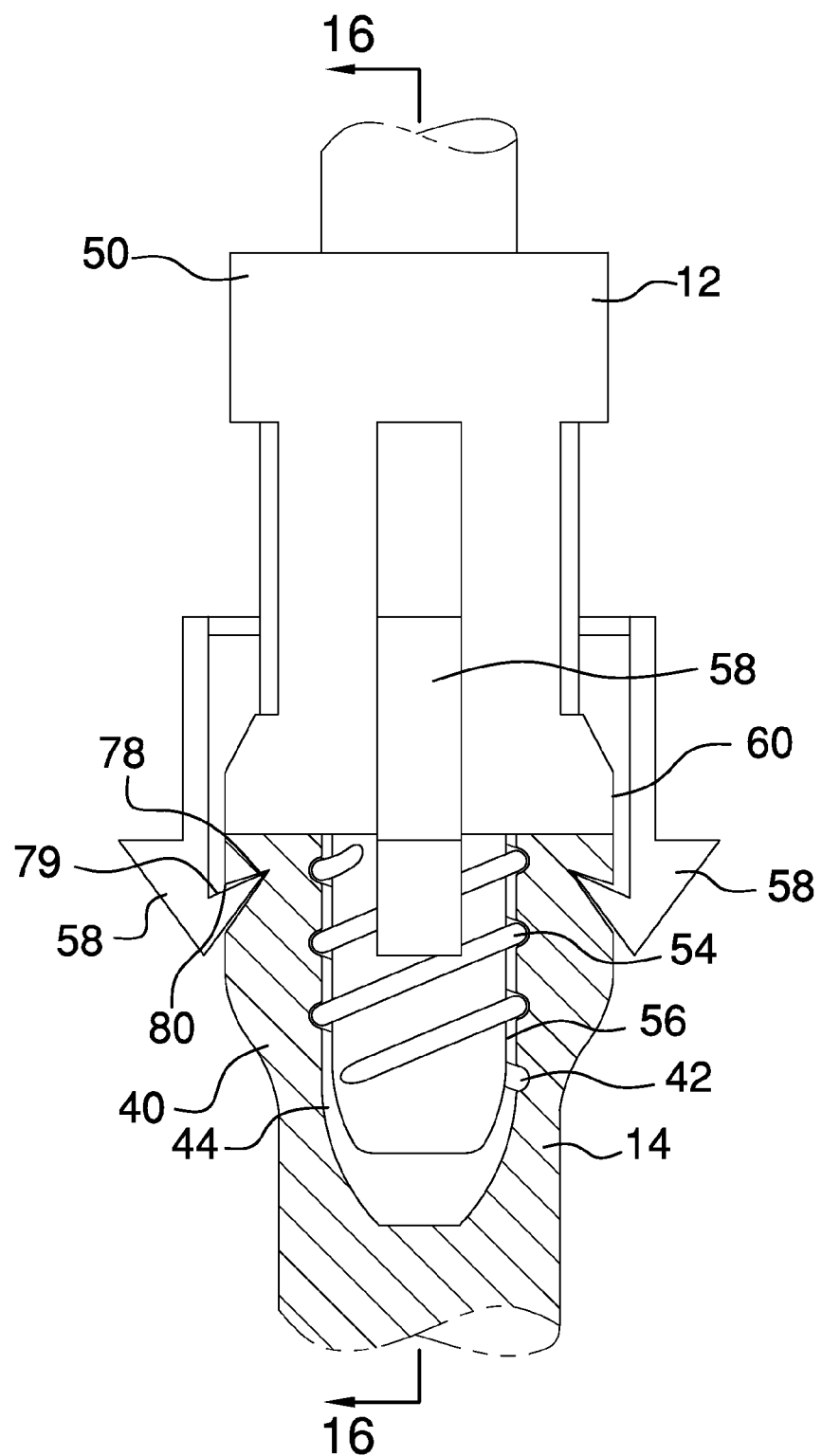
FIG. 15 is a partial front, partial cross-sectional view of the interchangeable tool device taken along line 15-15 in FIG. 1, illustrating the attachment of the handle and the tool head.
Figure 16:
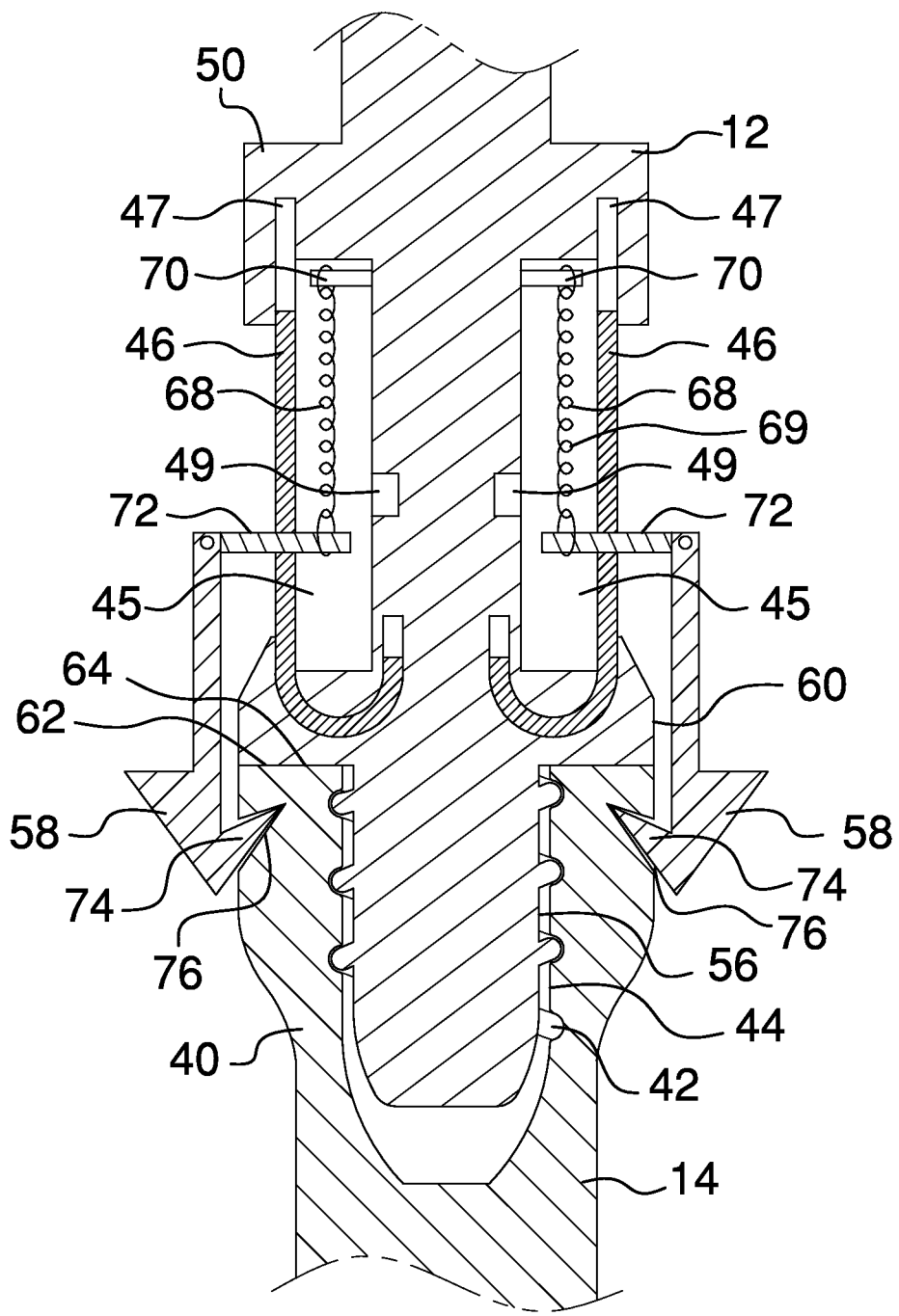
FIG. 16 is a partial front cross-sectional view of the interchangeable tool device taken along line 16-16 in FIG. 15, illustrating the attachment of the handle and the tool head.
Figure 17:
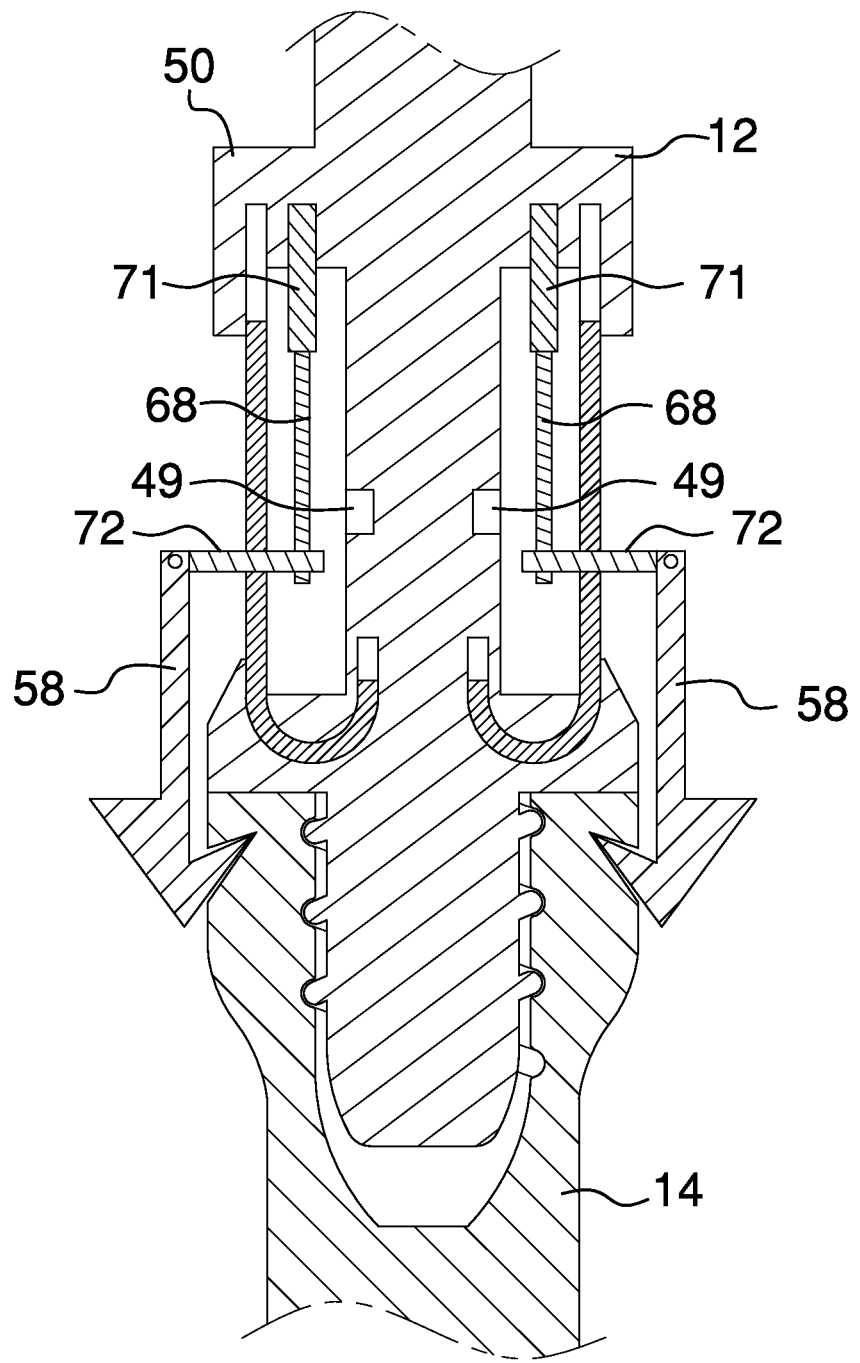
FIG. 17 is a partial front cross-sectional view of the interchangeable tool device taken along line 16-16 in FIG. 15, illustrating the attachment of the handle and the tool head.
Figure 18:
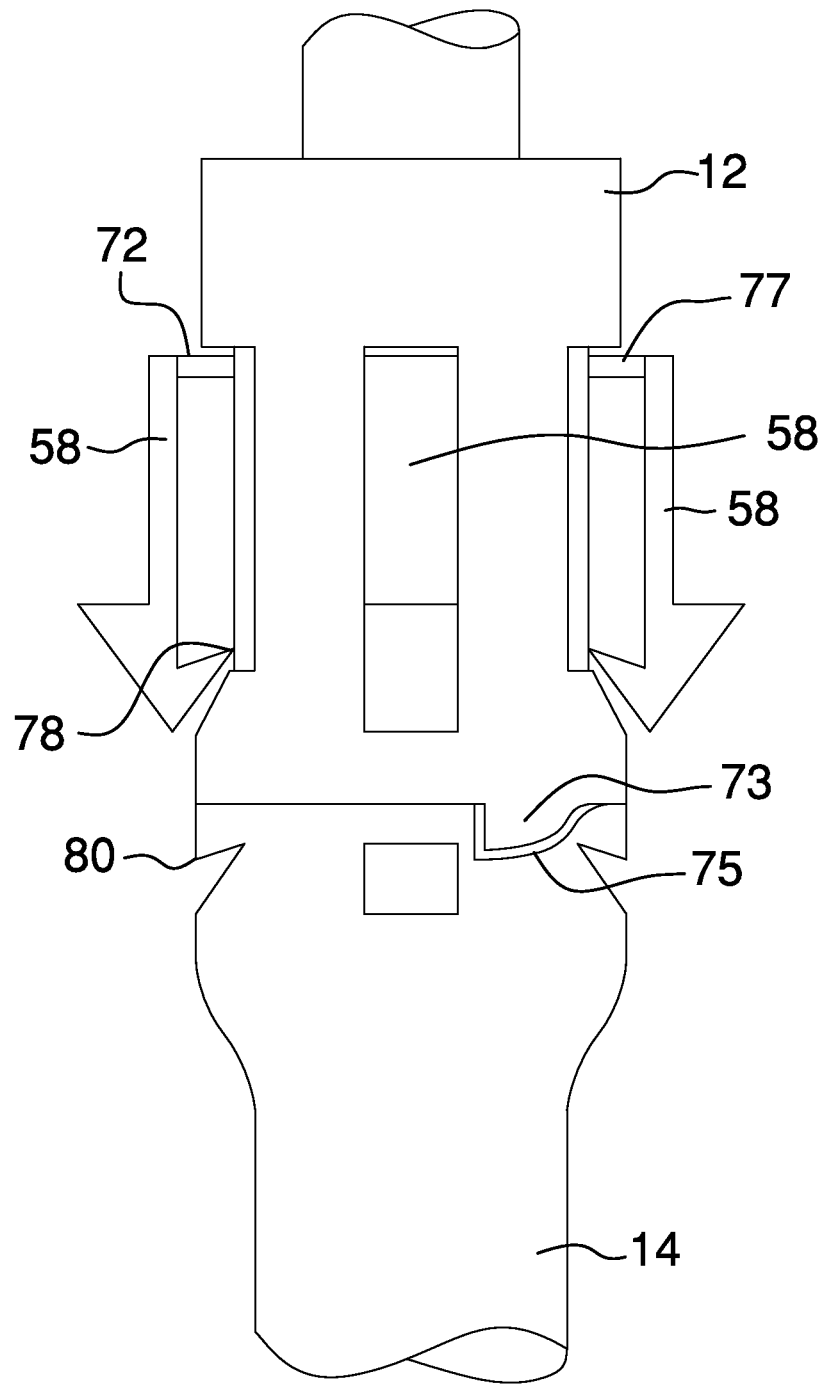
FIG. 18 is generally, the partial cross-sectional view of FIG. 15, but illustrating the lock members in a free position.
Figure 19:
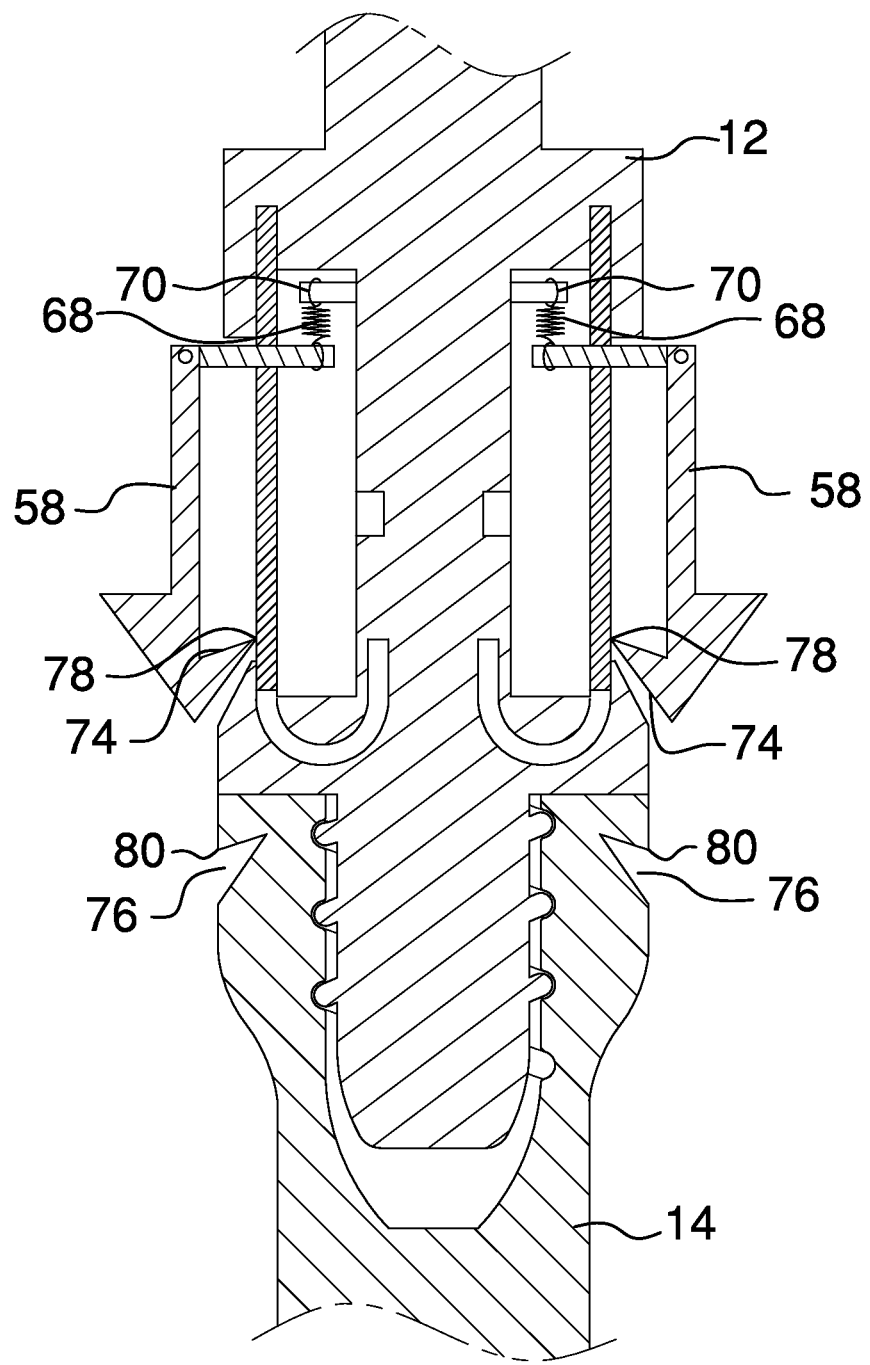
FIG. 19 is a partial cross-sectional view of the handle taken along line 19-19 in FIG. 18, showing the lock members in the free position.
Figure 20:
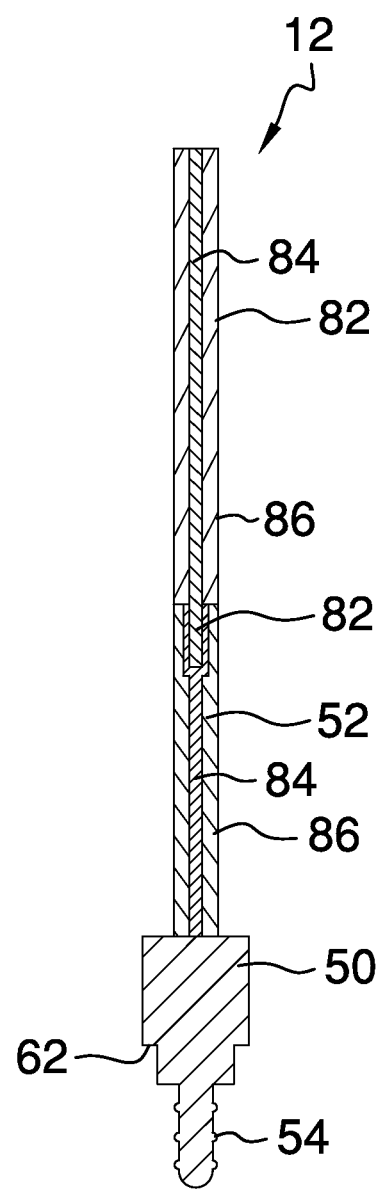
FIG. 20 is a cross sectional view of the handle illustrating a handle extension.
Figure 21:
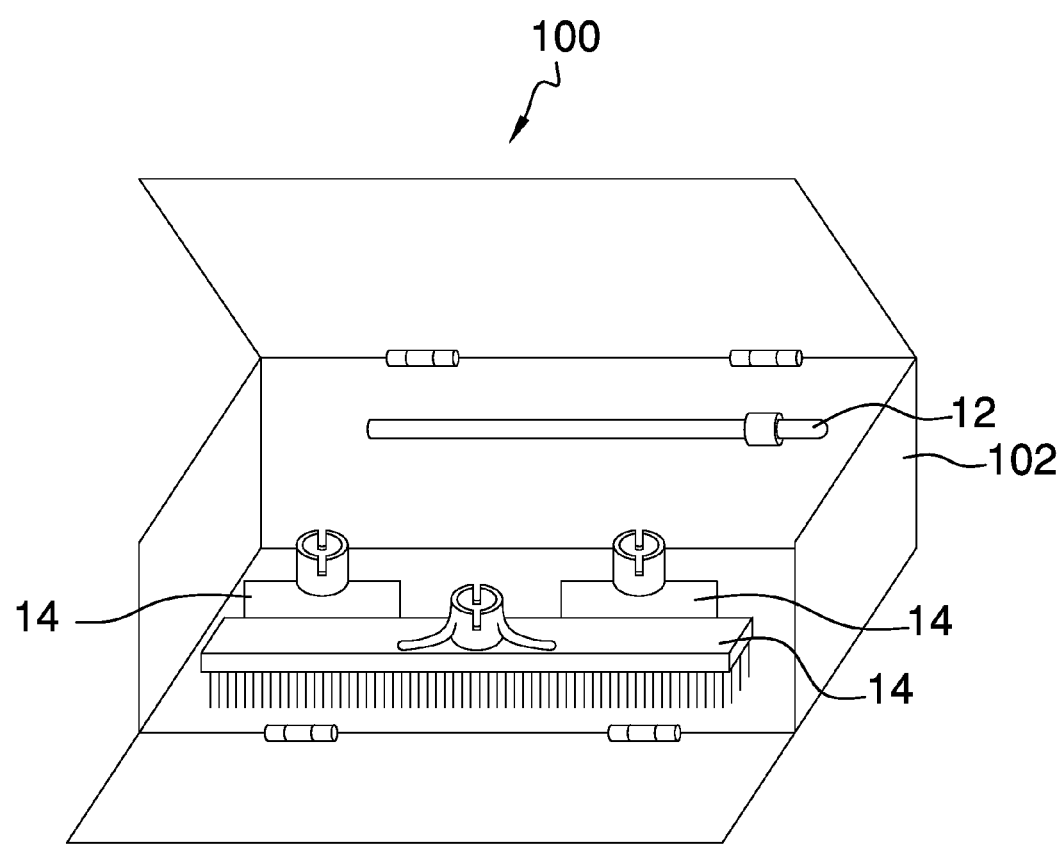
FIG. 21 is a perspective view of an interchangeable tool kit.

With reference to FIGS. 1 through 19, there is representatively illustrated a new interchangeable tool device 10 in accordance with an embodiment of the present invention. The interchangeable tool device 10 includes a handle 12 and a tool head 14. The tool head 14 may be of any configuration of tool that utilizes a handle.

Non-limiting examples of types of tool heads 14 include a shovel tool head 16 and 17, a rake tool head 18, a hammer tool head 20, an ax tool head 22, a squeegee tool head 24, a pick ax tool head 26, a scraper tool head 28, a noose tool head 30, a broom tool head 32, a magnetic pickup tool head 34, a hoe tool head 36, and a hook tool head 38. Many different variations of the particular examples of tool heads 14 may be used. For instance, a rake tool head 18 may be a garden rake or a leaf rake, or the broom tool head 32 may be a push broom or a sweep broom.

The tool head 14 includes a receiving end 40 for attachment to the handle 10. The receiving end 40 is similar for every type of tool head 14. The receiving end 40 includes an internal threaded portion 42 on a receiving circumference 44. The receiving end 40 also includes at least three detent apertures 76. The variation in the different tool heads 14 is apparent at a working end 48 where the working portion of the tool is located.

The handle 12 includes a forward end 50, and a rear end 52, an external threaded portion 54 on a mating circumference 56, and at least three lock members 58 on a locking circumference 60. The mating circumference 56 is configured to fit within the receiving circumference 44. The external threaded portion 54 is configured to cooperate with the internal threaded portion 42 to threadingly connect the handle 12 to the tool head 14.

The base surface 62 cooperates with the top surface 64 to provide a physical limit to axial movement of the handle 12 into the tool head 14 during attachment by threadingly connecting the external threaded portion 54 and the internal threaded portion 42. The external threaded portion 54 and the internal threaded portion 42 are aligned so that near the point of contact between the base surface 62 and top surface 64, detent apertures 76 are substantially aligned with the locking members 58. The substantial alignment allows the locking members 58 to be positioned above the detent apertures 76.

The handle 12 will preferably include an alignment tab 73. The tool head 14 will preferably include an alignment stop 75. The alignment tab 73 and the alignment stop 75 are positioned so that the alignment tab 73 makes contact with the alignment stop 75 during the process of threadingly connecting the external threaded portion 54 and the internal threaded portion 42 at a point where the locking members 58 are aligned with the detent apertures 76. The alignment tab 73 and the alignment stop 75 are positioned to prevent overtightening of the external threaded portion 54 and the internal threaded portion 42.

The positioning of a detent finger 74 of the locking members 58 within the detent aperture 76 limits relative rotation between the handle 12 and the tool head 14 because there is physical interference between the detent finger 74 and the detent aperture 76. The locking members 58 are biased toward a free position wherein the locking members 58 are substantially above the base surface 62. The locking members 58 are slidably movable between the free position to a locked position wherein the locking members 58 are at least partially below the base surface 62.

The locking members 58 are biased toward the free position by at least one spring element 68. Examples of spring elements 68 include coil springs 69, or vacuum sealed pistons 71. Preferably there will be one spring element 68 per locking member 58. The spring element 68 is affixed to a spring mount 70 and a bias tab 72. The locking members 58 may be manually moved between the free position to the locked position. The detent finger 74 is positioned within the detent aperture 76 to retain the locking member 58 in the locked position. The detent finger 74 includes an upper tip 78 that is at the top of the retention surface 79 that securely retains the detent finger 74 within the detent aperture 76.

In operation, the locking element 58 is manually moved from the free position the locked position by a downward force from the user. When the locking element 58 reaches the locked position, the user may press inwardly on the locking element 58 to move the detent finger 74 into the detent aperture 76. Once the detent finger 74 is substantially within the detent aperture 76. The user may release downward pressure on the locking member 58. The spring element 68 will move the locking member 58 upwardly so the angular design of the detent finger 74 and the detent aperture 76 retain the detent finger within the detent aperture. The spring element 68 retains pressure on the locking member 58 to keep the detent finger positioned against the detent aperture during use of the interchangeable tool device 10.

To release the locking member 58, the user should apply downward pressure so the upper tip 78 of the detent finger 74 is below the lower tip 80 of the detent aperture 76. Once the upper tip 78 of the detent finger 74 is below the lower tip 80 of the detent aperture, the user may apply outward pressure to remove the detent finger 74 from the detent aperture 76. The user may then allow the spring element 68 to return the locking member 58 to the free position.

The handle 12 includes spring channels 45. The spring channels 45 kept free of dirt and debris by covers 46. There is one cover 46 per spring channel 45. Each cover 46 is flexible and slides within a cover channel 47. The cover moves along with the locking member 58 because the bias tab 72 passes through the cover 46. The cover 46 is long enough that throughout the range of motion of the locking member 58, the cover 46 always covers the entirety of spring channel 45. The spring channels 45 also include magnets 49, which attract the locking members 58 toward the cover 46 when the locking members 58 are in the free position thereby reducing the tendency for the locking members 58 to swing away from the cover 46.

The covers 46 will preferably be a different color than the locking members 58. The user will be able to quickly ascertain whether or not the locking members 58 are in the locked position or the free position by the visibility of the color of the covers 46. If the cover 46 color is visible above the locking members 58, then the user will know that the tool is in the locked position and may be used normally. However, if the cover 46 color is not visible above the locking member 58, then the user will know that the locking members 58 must be secured prior to using the tool.

The handle 12 may include a handle extension 82 for use with tools that require longer handles than others. The handle extension 82 threads into the rear end 52 of the handle 12. The handle extension 82 has a male thread portion 84 that cooperates with a female thread portion 86 of the rear end 52 of the handle 12.

In some embodiments of the handle 12, the rear end 52 of a first handle 12 may be configured to receive the forward end 50 of a second handle 12. In these embodiments of the handle 12, the second handle 12 operates as a handle extension 82. Using the handle 12 as a handle extension 82 allows for more flexibility because if no handle extension 82 is required, then more than one tool head 14 may be attached to a handle 12 for quick use at the jobsite.

The handle 12 and the handle extension 82 may be manufactured from one material. The handle 12 and the handle extension 82 may also be manufactured from two or more materials. If the handle 12 and the handle extension 82 are manufactured from two or more materials, it is desirable to have a high strength core material 84 at the interior of the handle 12 and the handle extension 82 to provide a strong connection between the handle 12 and the handle extension 82. If the handle 12 and the handle extension 82 are manufactured from two or more materials, it is desirable to have a more compliant outer material 86 such as an elastomeric material, to improve the comfort of the handle 12 and the handle extension 82 for the user. It is important to note that the handle 12 and the handle extension 82 may be in any number of shapes to allow for the comfort of the user with various tools.

Some embodiments of the present invention will be in the form of a kit 100 containing at least two tool heads 14 and at least one handle 12. The kit 100 may also include a container 102 for storage and transportation of the tool heads 14 and the handles 12. The kit 100 may further include one or more handle extensions 82.

A first embodiment of the kit 100, particularly useful for homeowners, includes at least: two handles 12, one rake tool head 18, two shovel tool heads 16 and 17, one hammer tool head 20, one ax tool head 22, one squeegee tool head 24, one scraper tool head 28, two broom tool heads 32, one hoe tool head 36, and a hook tool head 38, and one pitch fork tool head.

A second embodiment of the kit 100, particularly useful for heavy use by contractors, includes at least: five handles 12, two rake tool heads 18, two pick ax tool heads 26, six shovel tool heads 16 and 17, two hammer tool heads 20, one ax tool head 22, one squeegee tool head 24, two broom tool heads 32, two hoe tool heads 36, one hook tool head 38, one pry bar tool head, one noose tool head 30, and two magnetic pickup tool heads 34.

A third embodiment of the kit 100, particularly useful for light use by contractors, includes at least: three handles 12, one rake tool head 18, one pick ax tool head 26, three shovel tool heads 16 and 17, one hammer tool head 20, two broom tool heads 32, one hoe tool head 36, one hook tool head 38, one noose tool head 30, and two magnetic pickup tool heads 34.

A number of embodiments of the present invention have been described. Nevertheless, it will be understood that various modifications may be made without departing from the spirit and scope of the invention. Accordingly, other embodiments are within the scope of the following claims.

What is claimed is:

1. An interchangeable tool device, comprising:
    a handle having a forward end, a rear end, an external threaded portion on a mating circumference of said forward end, and a plurality of lock members disposed on a locking circumference of said forward end;
    a tool head having a receiving end, a working end, an internal threaded portion on a receiving circumference of said receiving end, and a plurality of lock apertures;
    said plurality of lock members being movable between a locked position and a free position;
    said plurality of lock apertures receiving said plurality of lock members when said plurality of lock members are in said locked position;
    wherein said plurality of lock apertures and said plurality of lock members cooperate to limit rotation of said tool head relative to said handle when said plurality of lock members are in said locked position; and
    wherein said plurality of lock apertures and said plurality of lock members do not limit rotation of said tool head relative to said handle when said plurality of lock members are in said free position.

2. The interchangeable tool device of claim 1, wherein said plurality of lock members comprises four lock members, and wherein said plurality of lock apertures comprises four lock apertures.

3. The interchangeable tool device of claim 1, wherein said handle further comprises:
    at least one spring element connected to each of said plurality of lock members.

4. The interchangeable tool device of claim 1, wherein said at least one spring element biases said lock member to which it is connected toward said free position.

5. The interchangeable tool device of claim 1, wherein:
    each of said plurality of said lock apertures includes a detent aperture;
    each of said plurality of lock members includes a detent finger; and
    wherein said detent apertures receive said detent fingers when said lock members are in said locked position and cooperatively retain each of said plurality of lock members in said locked position.

6. The interchangeable tool device of claim 1, further comprising:
    a handle extension removably connectable to said handle.

7. An interchangeable tool kit, comprising:
    a first handle comprising a first forward end, and a first rear end, a first external threaded portion on a first mating circumference of said first forward end, and at least three first lock members on a first locking circumference of said first forward end;
    at least two tool heads each comprising a receiving end and a working end, a internal threaded portion on a receiving circumference of said receiving end, and at least three lock apertures;
    said at least three lock members being movable between a locked position and a free position;
    said at least three lock apertures receiving said at least three first lock members when one of said at least two tool heads is connected to said first handle and when said at least three first lock members are in said locked position;

wherein said at least three lock apertures and said at least three first lock members cooperate to limit rotation of said one of said at least tool head relative to said first handle when said at least three first lock members are in said locked position; and wherein said at least three lock apertures and said at least three first lock members do not limit rotation of said one of said at least two tool heads relative to said first handle when said at least three first lock members are in said free position.

8. The interchangeable tool kit of claim 7, wherein said each of said at least two tool heads are chosen from a group consisting of a rake tool head, a hoe tool head, a broom tool head, an ax tool head, a shovel tool head, a scraper tool head, a pitch fork tool head, a hook tool head, a squeegee tool head, a pick ax tool head, a magnetic pickup tool head, a noose tool head, and a pry bar.

* * * * *